United States Patent [19]
Christopher, Jr. et al.

[11] 3,956,145
[45] May 11, 1976

[54] FLUID FOR INJECTION INTO A SUBTERRANEAN RESERVOIR TO DISPLACE HYDROCARBONS IN THE RESERVOIR

[75] Inventors: Charles A. Christopher, Jr., Houston; Abdus Satter, Conroe, both of Tex.

[73] Assignee: Texaco Inc., New York, N.Y.

[22] Filed: Feb. 6, 1974

[21] Appl. No.: 440,116

Related U.S. Application Data

[62] Division of Ser. No. 319,067, Dec. 27, 1972, Pat. No. 3,818,989.

[52] U.S. Cl. ............................ 252/8.55 D; 166/275; 252/309; 252/312
[51] Int. Cl.² .......................................... E21B 43/22
[58] Field of Search ............ 166/273, 274, 275, 282, 166/283; 252/8.55 D, 309, 310, 313 S, 8.55 R; 260/42.55, 29.6 MH

[56] References Cited
UNITED STATES PATENTS

| | | |
|---|---|---|
| 3,208,515 | 9/1965 | Meadors ............................ 166/274 |
| 3,305,016 | 2/1967 | Lindblom et al. ................... 166/246 |
| 3,336,977 | 8/1967 | Amott................................. 166/274 |
| 3,615,791 | 10/1971 | Thomas et al. ................. 260/29.6 X |
| 3,634,288 | 1/1972 | Youngs ........................... 252/309 X |
| 3,705,860 | 12/1972 | Duvall............................. 252/309 X |
| 3,759,326 | 12/1973 | Christopher et al................ 166/275 |

Primary Examiner—Herbert B. Guynn
Attorney, Agent, or Firm—T. H. Whaley; C. G. Ries; Kenneth R. Priem

[57] ABSTRACT

In a subterranean reservoir containing both petroleum and water interspersed, the petroleum may be preferentially produced by injecting into one well penetrating the reservoir a slug of fluid comprising hydrocarbon solvent, colloidal silica, water and a polymeric material followed by a driving fluid comprising water to force the reservoir fluids into another well penetrating the reservoir where they are produced.

4 Claims, 2 Drawing Figures

FLUID FOR INJECTION INTO A SUBTERRANEAN RESERVOIR TO DISPLACE HYDROCARBONS IN THE RESERVOIR

This is a division, of application Ser. No. 319,067, filed Dec. 27, 1972, now Pat. No. 3,818,989.

BACKGROUND OF THE INVENTION

1. Field of the Invention

This invention pertains to the field of secondary and tertiary recovery of oil.

2. Description of the Prior Art

Petroleum in subterranean reservoirs, hereinafter referred to as oil, is often driven to production wells by encroaching water. This encroaching water may come, for example, from a large expanding aquifer. On the other hand water may have been injected into the reservoir to drive oil toward a production well as part of a secondary recovery operation. In either case a large amount of oil is likely to be left behind in the portion of the reservoir encountered by water. The recovery of this oil is complicated by many factors. One factor is the retentive forces tending to keep the oil from moving toward a production well. These factors are viscosity and capillarity. The other factor complicating the production of this oil is the fact that normal production methods in the reservoir where water encroachment has taken place will tend to produce large amounts of water along with the oil. This water presents a problem of disposal in handling which greatly affects the economics of an oil recovery program.

The oil left behind after water encroachment is often produced by injecting a fluid into the reservoir to drive or displace the oil in the reservoir to a production well. This procedure is called secondary recovery in the case where the encroaching water which swept through the reservoir in the first instance was due to natural forces. i.e., aquifer expansion. Where the injection of a fluid to produce oil follows another artificially induced attempt to add energy to the reservoir (water injection, gas injection, in situ combustion, etc.) the injection of fluid is called tertiary recovery. For simplicity, hereinafter all attempts to inject a fluid into a reservoir to displace oil toward a production well will be referred to as secondary recovery techniques regardless of the sequence or number of events prior to the instant recovery program.

In addition to oil production, the water in the reservoir will also be produced in large quantities as discussed above. Also, as mentioned above, the forces of viscosity and capillarity tend to reduce oil production. The retentive forces of viscosity may be removed, for example, by heating the formation to a point where the viscosity of the reservoir fluid becomes equal to or less than the viscosity of the displacing fluid or by increasing the viscosity of the displacing fluid. However, if the displacing fluid is not miscible with the oil the retentive forces of capillarity will not be removed. To remove the retentive forces of capillarity, for example, it is necessary to use a displacing fluid which is miscible with the oil. If the displacing fluid is miscible with the reservoir oil the interface between the oil and displacing fluid will be removed and, therefore, so will the retentive forces of capillarity.

Displacement efficiency is a term referring to amount of oil removed from the portion of the reservoir actually swept by the displacing fluid. Displacement efficiency may be low due to high surface tension at the interface between the displacing fluid and the oil in the reservoir. If this surface tension can be removed the capillary forces will be reduced to zero and the oil may be completely displaced from the portions of the reservoir contacted by the displacement fluid.

Sweep efficiency is a term referring to the percentage of the reservoir actually contacted or swept by the displacing fluid regardless of the amount of oil removed from the swept portion or displacement efficiency referred to above. A major cause of poor sweep efficiency is associated with the fact that the injected displacement fluid generally has a lower viscosity than the oil to be displaced.

If the viscosity of the fluid displacing the reservoir oil to the production wells is lower than the reservoir oil, premature breakthrough of the driving fluid into the production wells will occur. The displacing fluid actually fingers through the reservoir and proceeds to the production well before an adequate portion of the reservoir has been swept. The effects of viscosity on sweep efficiency may be described in terms of the mobility ratio. The mobility ratio is defined by the following equation:

$$M = \frac{\frac{K_2}{U_2}}{\frac{K_1}{U_1}}$$

where $M$ = mobility ratio;

$u_2, u_1$ = viscosity of displacing fluid and displaced fluid (oil), respectively;

$K_2, K_1$ = permeability of the formation with respect to the displacing fluid and the displaced fluid respectively.

At high mobility ratios the phenomenon commonly known as "fingering" occurs and the displacing fluid does not display a flat front to the reservoir oil but instead rushes ahead at various points in finger-like protrusions which may prematurely break through to the production wells. The oil in areas not touched by the fingers of displacing fluid are usually left unrecovered in pockets in the reservoir. These pockets are isolated and are likely to be lost forever. The preceding equation shows that the mobility ratio and the degree of fingering is directly proportional to the ratio of the displaced fluid viscosity to the displacing fluid viscosity $u_1/u_2$. Since most displacing fluids are less viscous than the displaced fluid (oil) the mobility ratio will usually be quite high and a poor aerial sweep efficiency will occur because of fingering.

This invention provides a method for increasing the amount of oil production relative to water production by solving the problems of viscosity and capillarity inhibiting oil production or providing at the same time a method of retarding water production.

SUMMARY OF THE INVENTION

The invention is a method for recovering oil from subterranean reservoirs containing both oil and an aqueous fluid. The reservoir is penetrated by at least one injection well and one production well. A displacing fluid is injected into the injection well and oil is produced from the production well. The fluid comprises a slug of a mixture of hydrocarbon solvent, colloidal silica, water and a high molecular weight polymer followed by another fluid to drive the slug through the reservoir. The invention is also the novel displacing fluid.

DESCRIPTION OF THE PREFERRED EMBODIMENTS

Figure 1:
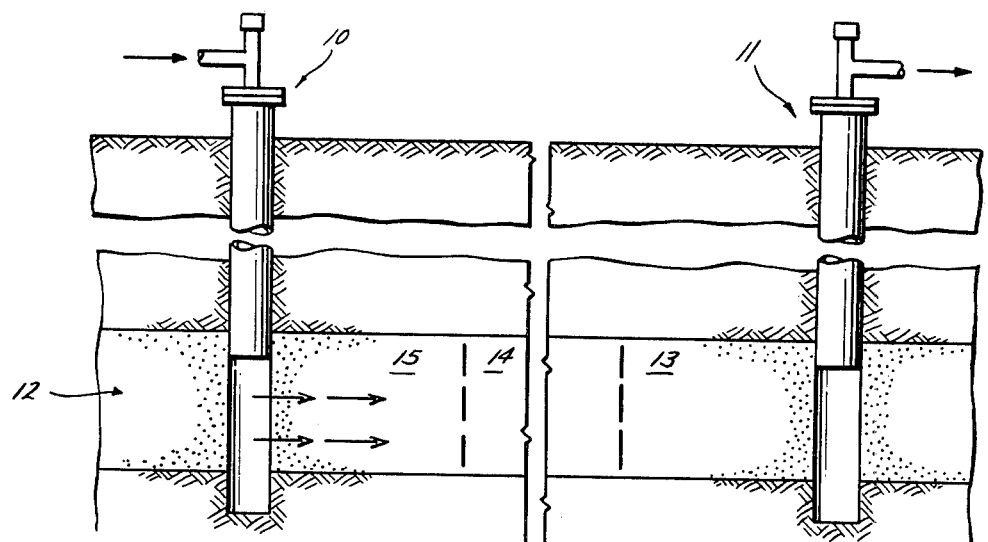
FIG. 1 depicts a typical situation in an oil bearing reservoir as the driving fluid of the invention travels from an injection well to a production well.

It often happens that a subterranean oil reservoir will contain a large amount of water or aqueous fluid such as brine in addition to the oil. This water or aqueous fluid may have originated from the natural soruces such as an aquifer or it may have been introduced by artificial means.

In a reservoir containing large amounts of water as well as oil the mobility of water ($K_w/u_w$, water effective permeability/water viscosity) is very large compared with the mobility of oil ($K_o/u_o$, oil effective permeability/oil viscosity). Our invention will reduce the mobility of water relative to oil by increasing the viscosity of an oil-miscible slug and/or decreasing the formation permeability to water and/or increasing the viscosity of injected and formation water. Our invention will also increase the oil displacement efficiency by injecting into the reservoir a fluid, a portion of which is miscible with oil but substantially immiscible with water. These things will be accomplished using a novel fluid to displace the reservoir fluids.

The novel displacing fluid comprises a solvent for the petroleum, thickened with colloidal silica or some other suitable material to increase the viscosity of the solvent to the range of the reservoir oil and emulsified with a water or brine solution of a high molecular weight polymer. Preferably, a surfactant or multi-functional material is added to improve the stability of the emulsion and to reduce the surface tension holding the oil to mineral surfaces. A slug of this primary displacing fluid is followed by continuous injection of another fluid, such as water or brine.

By way of explanation of the effects of such a displacing slug on the reservoir fluid the following is offered. However, the operation of our invention is not meant to be limited to specific mechanisms and the following is offered only to enable those skilled in the art to better understand our invention.

1. The oil-miscible thickened solvent portion of the slug forms a stable front against the oil since the mobility of the thickened solvent approaches that of the displaced reservoir oil. Also, since the solvent is miscible with oil the retentive force of capillarity impeding oil movement is removed. Therefore, fingering is reduced and increased displacement and aerial sweep efficiency is achieved.

2. The emulsion of water and polymer comes in contact with the water in the reservoir and some polymer is lost to the reservoir water. This lost polymer increases the viscosity of the reservoir water and permanently reduces the permeability of the reservoir to this water. This decreases the mobility of the reservoir water.

3. After injection of the slug comprising petroleum solvent, colloidal silica, water and polymer, another less expensive material, water or brine, for example, is injected to push the slug through the formation. The front of this following water is continuously thickened with polymer from the slug. Thus, the mobility of the trailing water and the slug will approach each other and the aerial sweep efficiency and displacement efficiency of the trailing water will be enhanced. Alternatively, the leading edge of the trailing water may be thickened before injection with a suitable material.

The size of the slug may vary over wide limits dictated by reservoir conditions and economics. The size of the slug is not critical to our invention as long as enough driving fluid is present to efficiently sweep the reservoir. For example, a slug of about 5 to 50% of pore volume should be satisfactory. For most applications a slug of from about 15 to 25% or pore volume is preferred.

The hydrocarbon solvent component of the slug of our invention must be a solvent for the reservoir hydrocarbons, that is, it must be miscible with the reservoir hydrocarbons. Examples of typical, suitable hydrocarbons are aromatics such as benzene and toluene and aliphatics such as LPG, propane, butane, isobutane, pentane, isopentane and hexane. Also, any mixture of suitable hydrocarbon solvents which when mixed retain their miscibility characteristics with the reservoir hydrocarbons are acceptable. An especially useful solvent would be a light cut from lease crude. Other solvents will occur to those skilled in the art without departing from the scope of our invention.

Colloidal silica is preferred as a thickener for the solvent portion of the slug in our invention. The colloidal silica acceptable for use in the method of this invention should have a particle size ranging from about 7 to 15 millimicrons (mu). In this size range the colloidal silica will pass through even reservoirs with very small pore sizes. For example, a reservoir having very low permeability of say 0.16 millidarcies (md) has a correspondingly small pore size of 25 to 100 microns. Thus, the colloidal silica suitable for use in the process of this invention will pass through even the smallest pores encountered in subterranean hydrocarbon reservoirs and will maintain a constant viscosity in the displacing fluid.

The colloidal silica useful in our invention is different from precipitated silica or silica gel. The colloidal silica useful in our invention is a fused silica which is made up of chain-like formations sintered together. These chains are branched and have enormous external surface areas of from about 50 to about 400 meters$^2$/gram. Each segment in the chain has many hydroxyl (OH) groups attached to silicon atoms at the surface. When the segments come into proximity to each other these hydroxy groups will bond to each other by hydrogen bonding to form a three-dimensional network. Colloidal silicas are readily available commercially. One source is the Cabot Corporation of Boston, Mass. under the trade name CAB-O-SIL. Colloidal silica is also available from other commercial sources and the reference to one source is not intended to limit the scope of our invention.

When the silica particles are dispersed in a liquid medium, the network structure formed by the silica particles restricts the movement of the molecules of the liquid medium. This in turn results in an increase in the viscosity of the liquid.

It is known that the thickening efficiency of the silica is directly related to the polarity of the liquid to be thickened. The use of selected additives (surfactants and/or multi-functional compounds) can increase the thickening efficiency of the silica. In the case of the hydrocarbon solvents, these additives react with the interface between the silica and the solvent and increase the degree to which the silica particles form the three-dimensional network. This allows less silica to be used to achieve equivalent thickening of the solvents. Usually less than 0.5% of the additive based on the weight of total liquid to be thickened will achieve marked increases in viscosity. The use of these optional additives may not be necessary to the successful operation of our invention. However, they may be used to optimize the efficiency of the thickening process.

The surfactant which may be used in the slug of our invention may broadly be any compound which reduces surface tension of the water, thus reducing the surface tension between the water and the reservoir oil. Soap may be used for instance, the sodium salts of high molecular weight alkyl sulfates or sulfonates. Also, very useful are nonionic surfactants which are usually a reaction product of a hydrophobic and a hydrophylic material such as the reaction product between mixed monoalkyl phenols and ethylene oxide. For example, low polarity liquids such as most hydrocarbon solvents are normally thickened by the use of anionic surfactants such as sodium linear alkyl sulfonates and multi-functional compounds such as a glycol. Ethylene glycol, propylene glycol are typical examples of useful multi-functional compounds which may be used. Other equivalents will be apparent to one skilled in the art.

The water portion of the slug of this invention may be fresh water or water containing various degrees of inorganic salts such as brine.

The polymer portion of the slug of our invention may be any polymer which will reduce the effective permeability to water of the formation behind the displacing fluid slug. The polymer will migrate from the slug into the water present in the reservoir to accomplish the permeability reduction. Typical examples of suitable polymers include polyacrylamides having from about 0 to about 75% of the amide groups hydrolyzed to carboxylate groups. It is preferred to have from about 0 to 30% of the amide group hydrolyzed to carboxylate groups. Especially preferred is a polyacrylamide of greater than 6 million molecular weight and approximately 5% of the amide groups hydrolyzed. Polysaccharides are also polymers useful in our invention. For example, a commercially available material is Kelzan MF (a xanthan gum produced by the action of the bacterium *Xanthomonas campestris*). Modifications of polysaccharides to increase their ionic character will make them even more useful in our invention.

Another type of polymer useful in our invention are water soluble starch derivatives containing carboxyl sulfonate or sulfate groups in the form of sodium or ammonium salts. Other useful polymers include but are not limited to soluble cellulose derivatives, polyvinyl alcohol, polyvinyl pyrrolidone, poly (arylic acid), poly (ethylene oxide) and polyethyleneimines. This listing is not exhaustive. Various other polymers may be used without departing from the scope and spirit of our invention. The following is a typical method of preparing the novel driving fluid or slug of our invention. It is given for illustration only and is not intended to limit the scope of our invention in any way. Other methods of preparation will no doubt become apparent to one skilled in the art after learning from the teachings found herein.

FORMING THE NOVEL DRIVING FLUID

To a volume of water is added 20% by weight colloidal silica with rapid stirring. A polar additive is added in an amount from 5 to 20 percent of the amount of colloidal silica added. Stirring forms a gel. The hydrocarbon solvent is added in an amount about equal to the original water volume with stirring. A solution of polymer in water is now added. The concentration of the polymer in the water will typically range from about 250 milligrams/liter (mg/l) to about 2000 mg/t. A preferred concentration is about 750 mg/t.

The displacing fluid described above may now be diluted with water and/or solvent to obtain a typical fluid having a viscosity of about 10 centipoise (cp). The fluid has the approximate composition: 100 mg/l polymer, 800 mg/l colloidal silica, 400 mg/l surfactant, 80% solvent and 20% water. The compositions possible are infinite and may be formulated using the above teachings by one skilled in the art.

One of the most critical criteria for formulating a driving fluid is the viscosity needed. The optimum viscosity of a driving slug is that which causes a mobility ratio of about one between the slug and the reservoir oil. The slug may be adjusted in viscosity by the general techniques previously described.

FIG. 1 depicts a cut-away view of an oil reservoir 12 which has previously been waterflooded and contains an oil saturation $S_o$ of 30% and a water saturation $S_w$ of 70%. The reservoir is penetrated by an injection well 10 and a production well 11, both wells being in fluid communication with the reservoir. The driving slug 14, comprising colloidal silica, water, solvent and polymer, was injected into the injection well 10 and has traveled some distance out into the reservoir. The area 13 is that portion of the reservoir as yet untouched by the driving slug 14. The area 15 behind the driving slug contains very little oil ($S_o$ about 2%) and contains polymer absorbed from the slug onto the reservoir rock or mechanically entrapped. Relative permeability to water has been reduced by a factor of at least 3. The slug will continue to push the oil ahead of it and leave behind most of the water until breakthrough of the slug occurs at production well 11.

Figure 2:
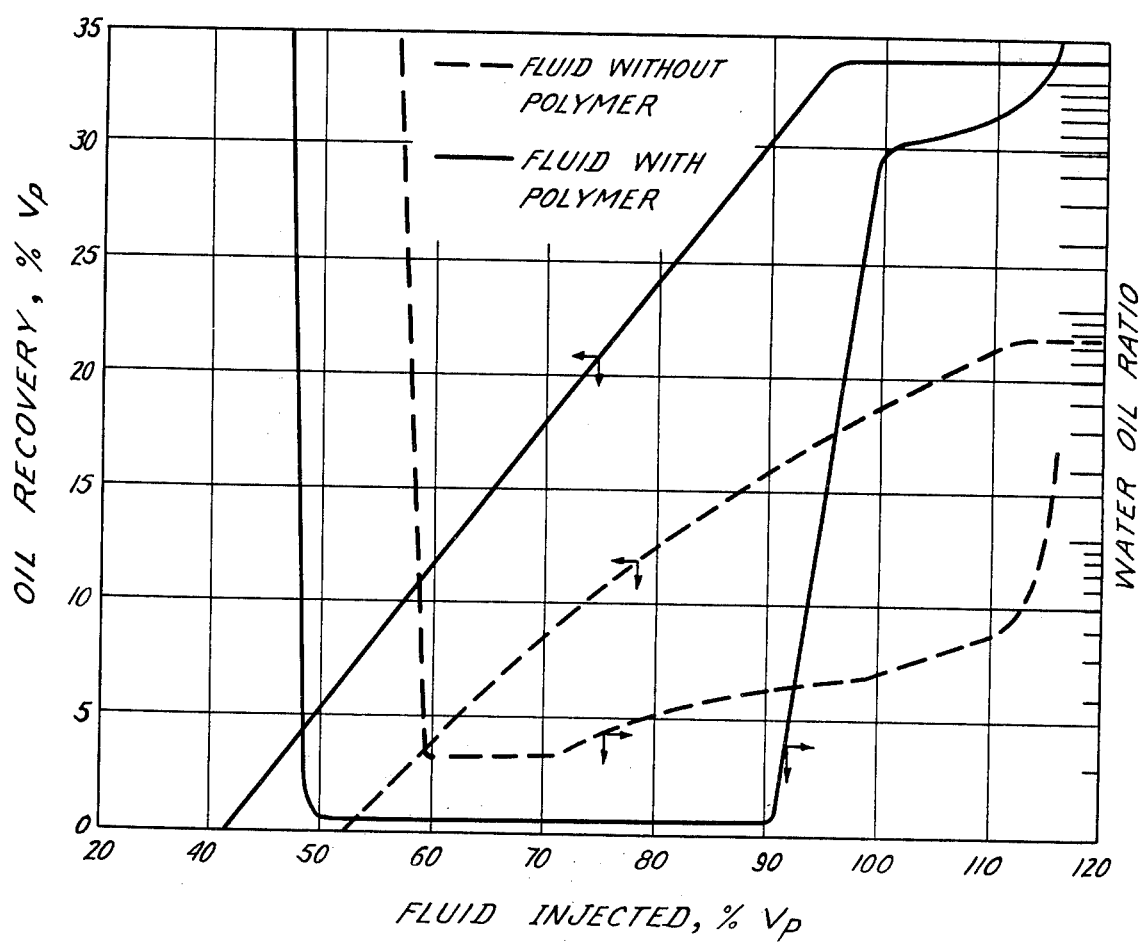
FIG. 2 is a plot showing the advantages of using the method of our invention in an oil reservoir containing a high water saturation.

FIG. 2 depicts the results of a mathematical simulation of the method of our invention performed in a linear reservoir. The reservoir was modeled having properties as follows:

Thickness, 29 feet
Porosity (fraction), 0.19
Absolute Permeability, 0.194 Darcy
Initial Water Saturation, 65%
Initial Oil Saturation, 35%
Oil Viscosity, 30 centipoise
Distance from Injector to Producer, 330 feet These fluids were separately injected by simulation. A comparison was made of the performance of each fluid. The fluid of the invention, as described earlier, had 100 mg/l polymer, 800 mg/l colloidal silica, 400 mg/l surfactant, 80% solvent and 20% water. The other fluid was of like composition except that it contained no polymer. FIG. 2 shows the results of the performance of these two fluids. The fluid of the invention containing polymer recovered 34.2% of the oil in place; while the fluid without the polymer recovered only 22% of the oil in place. Moreover, the fluid of the invention recovered the oil at a lower water-oil ratio than the fluid without the polymer. The extremely efficient fluid of the invention lowered the residual oil saturation to 0.8%.

We claim:

1. A fluid for injection into a subterranean hydrocarbon reservoir to displace hydrocarbons in the reservoir which comprises a mixture of hydrocarbon solvent in an amount sufficient to provide miscibility with hydrocarbons contacted in the reservoir, an amount of colloidal silica having a particle size ranging from about 7 to 15 millimicrons and a surface area of from about 50 to about 400 meters $^2$/gram sufficient to thicken the solvent, water in an amount sufficient to emulsify the hydrocarbon solvent and a high molecular weight polymer selected from the group consisting of polyarylamides, polysaccharides produced by the bacterium *Xanthomonas campestris*, water soluble starch derivatives containing carboxyl, sulfonate or sulfate group, polyvinyl alcohol, polyvinyl pyrrolidone, poly (arylic acid), poly (ethylene oxide) and polyethyleneimines in an amount sufficient to migrate from the mixture into the water present in the reservoir and reduce permeability of the reservoir to water.

2. A fluid as in claim 1 wherein the fluid also contains 0.5 weight percent or less of surfactant.

3. A fluid as in claim 1 wherein the fluid also contains less than 0.5 weight percent of a multifunctional compound selected from the group consisting of ethylene glycol and propylene glycol.

4. A fluid as in claim 1 wherein the fluid also contains less than 0.5 weight percent of a surfactant and a multifunctional compound selected from the group consisting of ethylene glycol and propylene glycol.

* * * * *